US010922830B2

(12) United States Patent
Barish et al.

(10) Patent No.: US 10,922,830 B2
(45) Date of Patent: Feb. 16, 2021

(54) SYSTEM AND METHOD FOR DETECTING A PRESENCE OR ABSENCE OF OBJECTS IN A TRAILER

(71) Applicant: Zebra Technologies Corporation, Lincolnshire, IL (US)

(72) Inventors: Justin F. Barish, Kings Park, NY (US); Adithya H. Krishnamurthy, Hicksville, NY (US)

(73) Assignee: Zebra Technologies Corporation, Lincolnshire, IL (US)

(*) Notice: Subject to any disclaimer, the term of this patent is extended or adjusted under 35 U.S.C. 154(b) by 111 days.

(21) Appl. No.: 16/225,802

(22) Filed: Dec. 19, 2018

(65) Prior Publication Data
US 2020/0202544 A1  Jun. 25, 2020

(51) Int. Cl.
*G06T 7/55* (2017.01)
*G06Q 10/08* (2012.01)
*G06T 7/10* (2017.01)

(52) U.S. Cl.
CPC ........... *G06T 7/55* (2017.01); *G06Q 10/0833* (2013.01); *G06T 7/10* (2017.01)

(58) Field of Classification Search
None
See application file for complete search history.

(56) References Cited

U.S. PATENT DOCUMENTS

2010/0073476 A1* 3/2010 Liang ............... G06Q 10/08
348/136
2014/0036072 A1* 2/2014 Ronald ............. G06K 9/00771
348/143

\* cited by examiner

*Primary Examiner* — Leon Flores
(74) *Attorney, Agent, or Firm* — Yuri Astvatsaturov

(57) ABSTRACT

A system and method for detecting a presence or absence of objects in a trailer are described. A 3D depth-camera is oriented to capture a 3D image. The 3D image includes a plurality of 3D point data defining a portion of a wall, floor, and top of a trailer. The plurality of 3D point data is then analyzed to determine a first, second, and third sub-plurality of points, associated with the portion of the wall, floor, and top, respectively. The first, second, and third sub-pluralities are then removed from the plurality of points to obtain a modified plurality of points, representing a modified 3D image. The modified 3D image is then segmented into a plurality of bins, and the plurality of bins are analyzed to determine one or more points-bin values. A communication is then provided based on whether any of the points-bin values exceeds a threshold value.

20 Claims, 7 Drawing Sheets

(2 of 7 Drawing Sheet(s) Filed in Color)

SYSTEM AND METHOD FOR DETECTING A PRESENCE OR ABSENCE OF OBJECTS IN A TRAILER

BACKGROUND OF THE INVENTION

In commercial trailer loading, often trailers need to be unloaded, and appropriate metrics need to be provided for this use case. As such, one important metric is whether or not a trailer has been completely emptied. The cost of tracking a package that was left accidentally in a trailer during an unload operation is very high to the shipping companies. Therefore the companies are looking for ways to auto detect and flag such incidents during unload. Currently, no such method exists to make this determination automatically, and inconsistent 3D (also referred to as "three-dimensional") data due to signal noise and the presence of the floor, walls, and ceiling, makes solving this problem difficult.

Accordingly, there is a need for a trailer monitoring unit that detects and prevents leaving packages or other objects in a trailer during the trailer unloading process.

BRIEF DESCRIPTION OF THE SEVERAL VIEWS OF THE DRAWINGS

The patent or application file contains at least one drawing executed in color. Copies of this patent or patent application publication with color drawing(s) will be provided by the Office upon request and payment of the necessary fee.

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
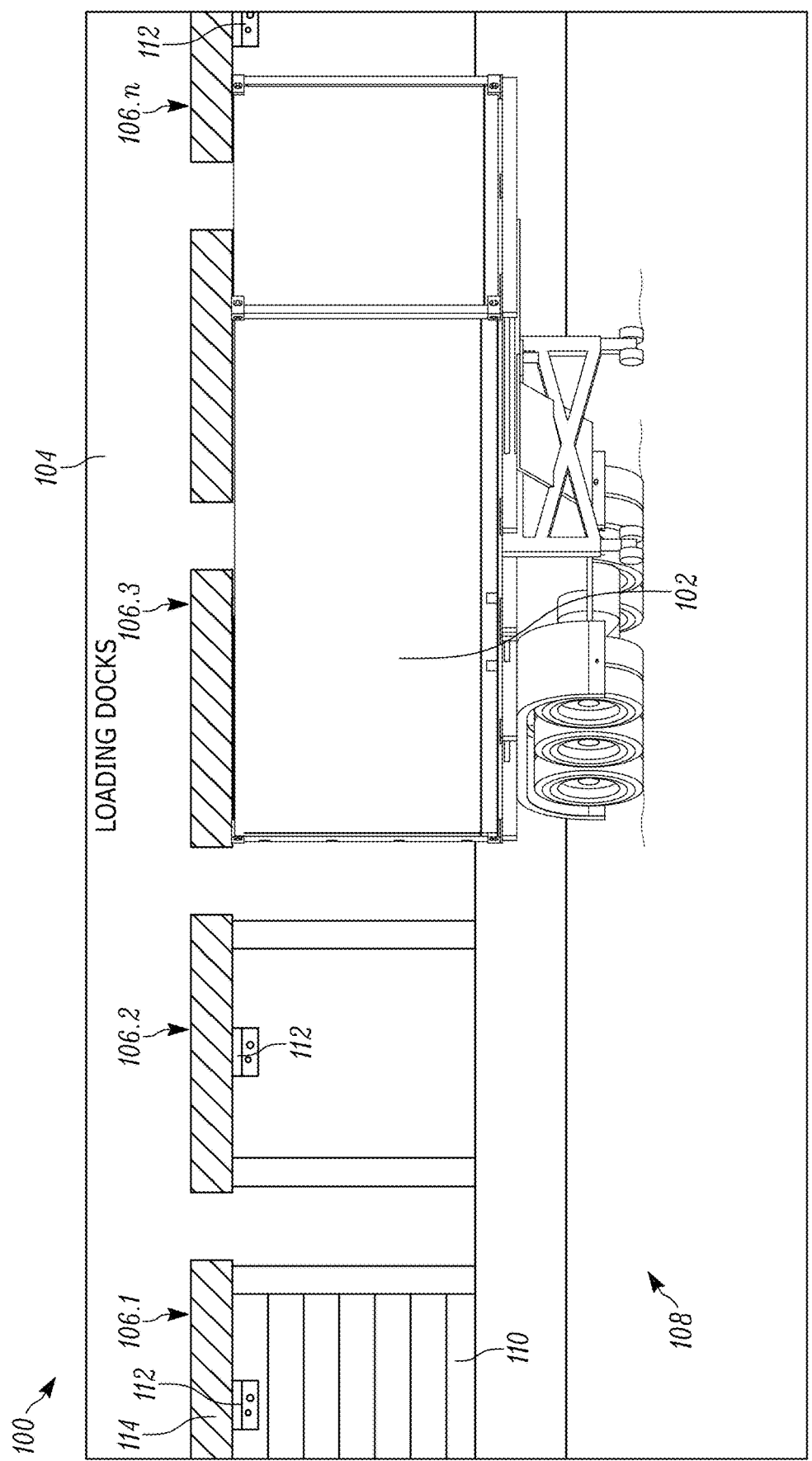
FIG. 1 illustrates a loading facility, in accordance with an embodiment of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

As used herein, the term "container" shall refer to any container transportable by at least one of a vehicle, a train, a marine vessel, and airplane, and configured to store transportable goods such as boxed and/or unboxed items and/or other types of freight. Accordingly, an example of a container includes an enclosed container fixedly attached to a platform with wheels and a hitch for towing by a powered vehicle. An example of a container also includes an enclosed container removably attached to a platform with wheels and a hitch for towing by a powered vehicle. An example of a container also includes an enclosure that is fixedly attached to a frame of a powered vehicle, such as the case may be with a delivery truck, box truck, etc. As such, while the exemplary embodiment(s) described below may appear to reference one kind of a container, the scope of the invention shall extend to other kinds of container, as defined above. Furthermore, the term "trailer" is an example of application of a container, in particular, a container used with a vehicle, such as a powered vehicle, like a delivery truck, box truck, etc.

In an embodiment, the present invention is a method for detecting a presence or absence of objects in a trailer. The method includes capturing a three-dimensional image, the three-dimensional image comprising three-dimensional point data having a plurality of points, and the three-dimensional image defining: (1) a portion of a wall of the trailer, (2) a portion of a floor of the trailer, and (3) a top portion of the trailer. The method further includes analyzing the plurality of points to determine a first sub-plurality of points associated with the portion of the wall of the trailer, to determine a second sub-plurality of points associated with the portion of the floor of the trailer, and to determine a third sub-plurality of points associated with the top portion of the trailer. The method then includes removing the first sub-plurality of points from the plurality of points, removing the second sub-plurality of points from the plurality of points, and removing the third sub-plurality of points from the plurality of points to obtain a modified plurality of points 602, wherein the modified plurality of points 602 represents a modified three-dimensional image. The method further includes segmenting the modified three-dimensional image into a plurality of bins, analyzing one or more of the plurality of bins to determine one or more points-bin values, and providing at least one of: (1) a first communication representative of the presence of objects in the trailer when at least one of the one or more points-bin values exceeds a threshold value, or (2) providing a second communication representative of the absence of objects in the trailer when none of the one or more points-bin values exceeds the threshold value.

In another embodiment, the present invention is a system for detecting a presence or absence of objects in a trailer. The system includes a user interface, and a trailer monitoring unit (TMU) mounted proximate a loading bay and communicatively connected with the user interface. The TMU includes a housing and an imaging assembly at least partially within the housing and configured to capture a three-dimensional image, the three-dimensional image comprising three-dimensional point data having a plurality of points, and the three-dimensional image defining: (1) a portion of a wall of the trailer, (2) a portion of a floor of the trailer, and (3) a top portion of the trailer. The TMU is configured to analyze the plurality of points to determine a first sub-plurality of points associated with the portion of the wall of the trailer, to determine a second sub-plurality of points associated with the portion of the floor of the trailer, and to determine a third sub-plurality of points associated with the top portion of the trailer. The TMU is further configured to remove the first sub-plurality of points from the plurality of points, remove the second sub-plurality of points from the plurality of points, and remove the third sub-plurality of points from the plurality of points to obtain a modified plurality of points 602, wherein the modified plurality of points 602 represent a modified three-dimensional image. The TMU is further configured to segment the modified three-dimensional image into a plurality of bins and provide a primary communication representative of the modified three-dimensional image segmented into a plurality of bins. The system further includes a server communicatively connected to the TMU and user interface. The server is configured to receive the primary communication from the TMU, analyze one or more of the plurality of bins to determine one or more points-bin values, and provide at least one of: (1) a first communication to a client device representative of the presence of objects in the trailer when at least one of the one or more points-bin values exceeds a threshold value, or (2) providing a second communication to a client device representative of the absence of objects in the trailer when none of the one or more points-bin values exceeds the threshold value. In this embodiment, the client device is communicatively coupled to the server.

Referring now to the drawings, FIG. 1 illustrates an exemplary environment where embodiments of the present invention may be implemented. In the present example, the environment is provided in a form of a loading dock 100 (also referred to as a loading facility) where containers 102 are loaded with various goods and/or where various goods are unloaded from the containers 102. The loading dock 100 is comprised of a facility 104 having a plurality of loading bays 106.1-106.n facing a loading facility lot 108 where vehicles, such as semis (not shown), deliver and pick up containers 102. To be loaded, each trailer 102 is backed toward the facility 104 such that it is generally perpendicular with the wall having the plurality of loading bays 106.1-106.n, and in line with one of the loading bays (in this case 106.3). As illustrated, each respective loading bay of the plurality of loading bays 106.1-106.n includes a bay door 110 that can be lowered to close the respective loading bay or raised to open the respective loading bay allowing the interior of the facility 104 to be accessible therethrough. Additionally, each respective loading bay is provided with a respective TMU 112. The respective TMU 112 is mounted near the trailer 102 loading area, preferably in the upper section of the respective loading bay outside the door 110 facing the loading facility lot 108 or an interior/rear of a trailer 102 if one is docked at the respective loading bay. To protect the respective TMU 112 from inclement weather, it could be mounted under a bay awning 114. Once docked, goods can be loaded onto/unloaded from the trailer 102 with the respective TMU 112 maintaining a view of the rear/inside of the trailer 102. In various embodiments, the trailer 102 may be in a drop-frame configuration or a straight-rail configuration.

Figure 2:
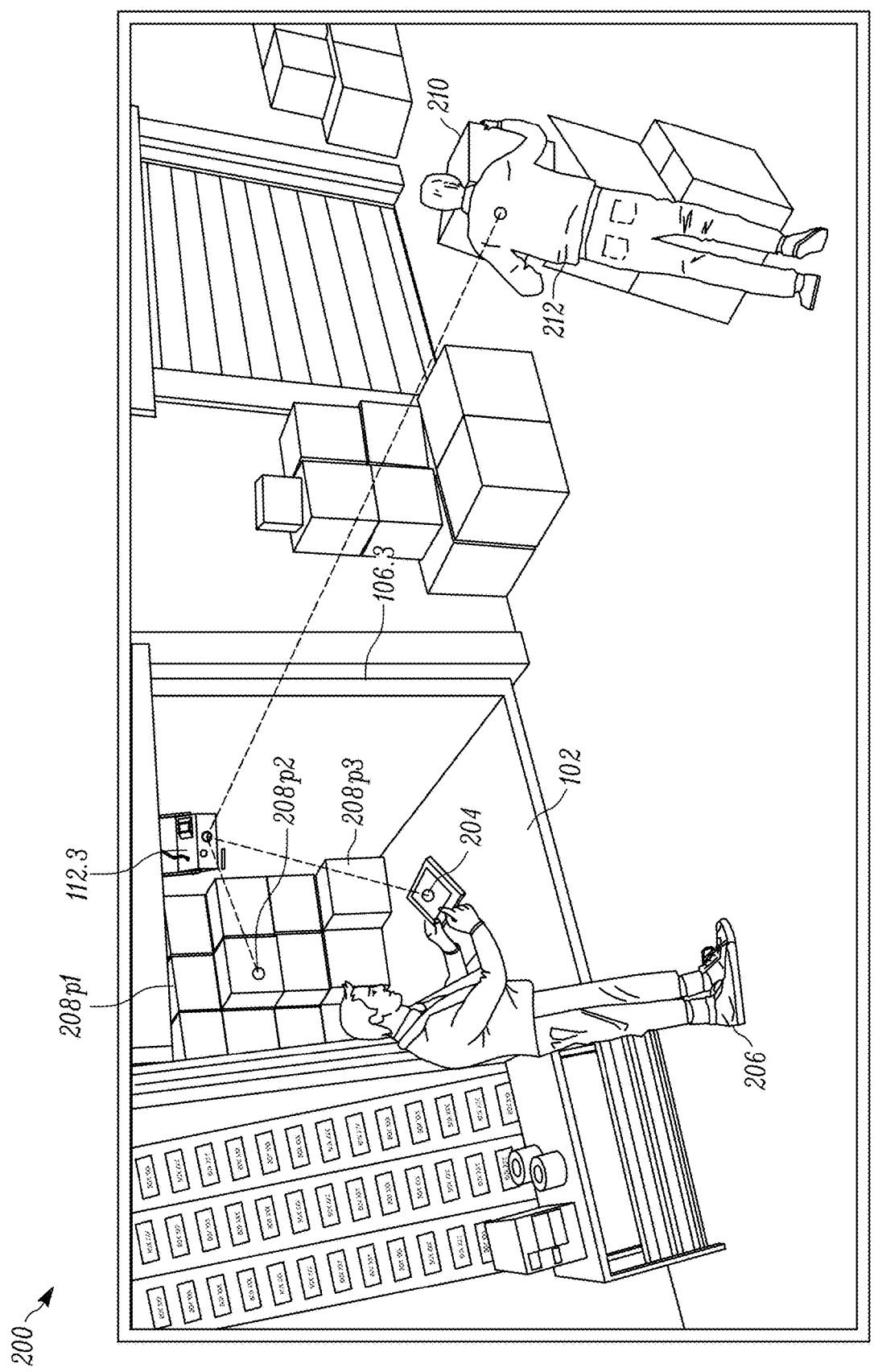
FIG. 2 illustrates an interior of the loading facility of FIG. 1.

FIG. 2 is a perspective view 200 of the loading facility 100 of FIG. 1 depicting trailer 102 docked at a loading bay 106.3, in accordance with example embodiments herein. For example, FIG. 2 depicts trailer 102, which in the embodiment of FIG. 2 is an interior view of the trailer 102 of FIG. 1. FIG. 2 also depicts loading bay 106.3, which in the embodiment of FIG. 2 is an interior view of the loading bay 106.3 of FIG. 1. As depicted in FIG. 2, trailer 102 is docked with loading bay 106.3 exposing the interior of trailer 102 to the interior of loading facility 100. Trailer 102 includes packages, boxes, and/or other transportable objects or goods, including packages 208p1-208p3. The packages 208p1-208p3 may be in a state of being loaded or unloaded into trailer 102. For example, worker 212 may be in a state of loading or unloading additional packages 210 into or out of trailer 102. In some embodiments, manager 206 may oversee, assist, or otherwise additionally facilitate the loading or unloading packages, boxes, and/or other transportable objects or goods (e.g., packages 208p1-208p3 or 210) into or out of the trailer 102. For example, manager 206 may utilize a dashboard app executing on client device 204 as described herein.

FIG. 2 also depicts a TMU 112.3. TMU 112.3 may include one or more processors and one or more computer memories for storing image data, and/or for executing apps that perform analytics or other functions as described herein. In various embodiments, and as shown in FIG. 2, the TMU 112.3 may be mounted within loading facility 100 and oriented in the direction of trailer 102 to capture 3D and/or 2D image data of the interior of trailer 102. For example, as shown in FIG. 2, TMU 112.3 may be oriented such that the 3D and 2D cameras of TMU 112.3 look down the length of the trailer 102 so that TMU 112.3 may scan or sense the walls, floor, ceiling, packages (e.g., 208p1-208p3 or 210), or other objects or surfaces with trailer 102 to determine the 3D and 2D image data. The image data may be processed by the one or more processors and/or memories of the TMU 112.3 (or, in some embodiments, one or more remote processors and/or memories of a server) to implement analysis, functions, such as graphical or imaging analytics, as described by the one or more various flowcharts, block diagrams, methods, functions, or various embodiments herein.

In some embodiments, for example, the TMU 112.3 may process the 3D and 2D image data, as scanned or sensed from the 3D-depth camera and photo-realistic camera, for use by other devices (e.g., client device 204, or server 410 as further described herein). For example, the one or more processors and/or one or more memories of the TMU 112.3 may process the image data scanned or sensed from trailer 102. The processing of the image data may generate post-scanning data that may include metadata, simplified data, normalized data, result data, status data, or alert data as determined from the original scanned or sensed image data. In some embodiments, the image data and/or the post-scanning data may be sent to a client application, such as a dashboard application (app) described herein, for viewing, manipulation, or otherwise interaction. In other embodiments, the image data and/or the post-scanning data may be sent to a server (e.g., server 410 as further described herein) for storage or for further manipulation.

As shown in FIG. 2, the image data and/or the post-scanning data may be received on client device 204. Client device 204 may implement a dashboard app to receive the image data and/or the post-scanning data and display such data, e.g., in graphical or other format, to manager 206 to facilitate the unloading or loading of packages (e.g., 208p1-208p3 or 210), as described herein. In some embodiments, the dashboard app may receive the image data and/or the post-scanning data and display such data in real-time. Client device 204 may be a mobile device, such as a tablet, smartphone, laptop, or other such mobile computing device. Client device 204 may also include wired or wireless transceivers for receiving image data and/or post-scanning data as described herein. Such wired or wireless transceivers may implement one or more communication protocol standards including, for example, TCP/IP, WiFi (802.11b), Bluetooth, or any other similar communication protocols or standards.

In some embodiments, the image data and/or the post-scanning data may be sent to a server, such as server 410 described herein. In such embodiments, the server may generate post-scanning data, that may include metadata, simplified data, normalized data, result data, status data, or alert data as determined from the original scanned or sensed image data provided by the TMU 112.3. As described herein, the server may store such data, and may also send the image data and/or the post-scanning data to a dashboard app, or other app, implemented on a client device, such as the dashboard app implemented on client device 204 of FIG. 2.

Figure 3:
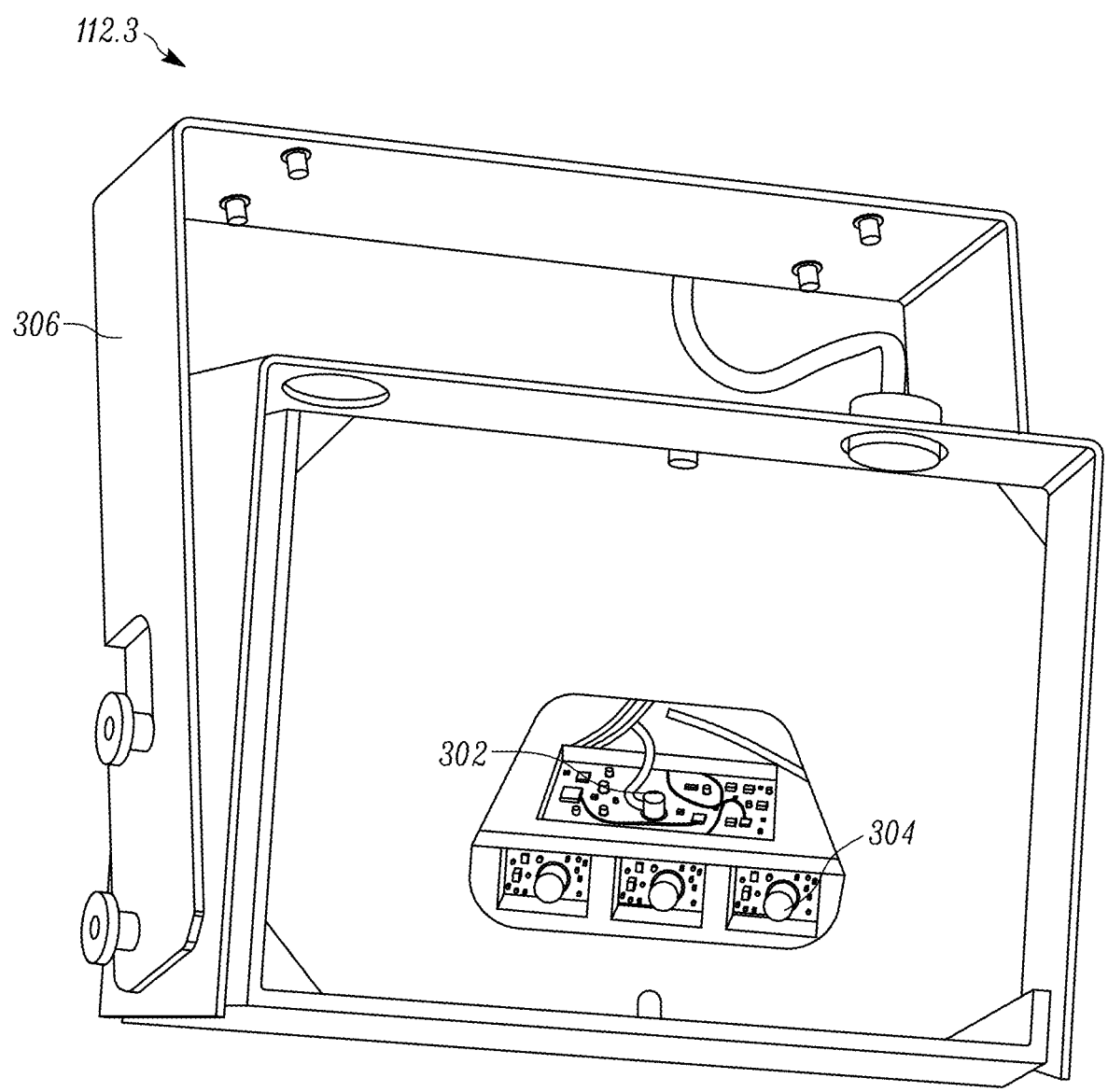
FIG. 3 illustrates a trailer monitoring unit (TMU), in accordance with an embodiment of the present invention.

In the currently described embodiment and as shown in FIG. 3, the TMU 112.3 is a mountable device that includes an imaging assembly 302 (referred to herein as a "3D-depth camera") for capturing 3D (three dimensional) images (e.g., 3D image data comprised of a plurality of points with three-dimensional point data) and a 2D camera 304 for capturing 2D images (e.g., 2D image data). The 2D camera may be an RGB (red, green, blue) camera for capturing 2D images. TMU 112.3 may further include a network interface to enable communication with other devices (such as server 410). The network interface of TMU 112.3 may include any suitable type of communication interface(s) (e.g., wired and/or wireless interfaces) configured to operate in accordance with any suitable protocol(s). In various embodiments, and as shown in FIGS. 1 and 2, the TMU 112.3 is mounted via a mounting bracket 306 and oriented in the direction of docked trailers 102 to capture 3D and/or 2D image data of the interior and exterior thereof.

In an embodiment, to capture 3D image data, the 3D depth camera 302 includes an Infra-Red (IR) projector and a related IR camera, and a depth-detection application executing on one or more processors or memories of the TMU 112.3.

Figure 4:
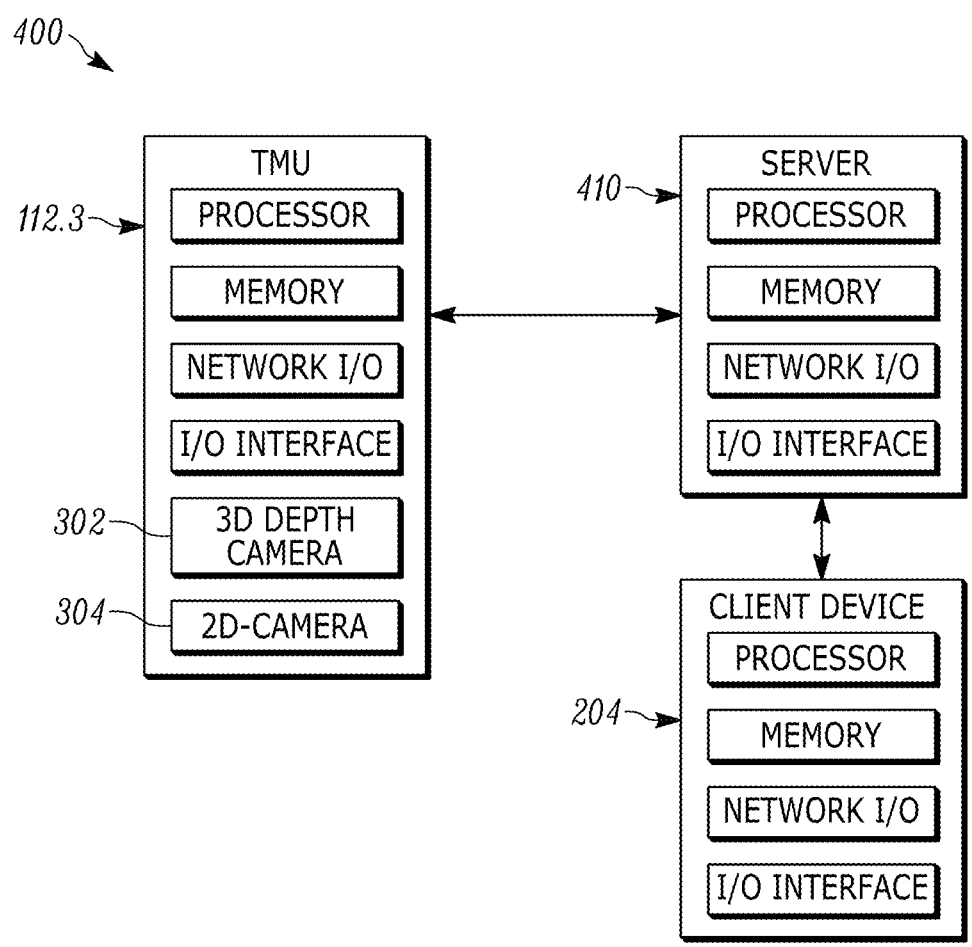
FIG. 4 illustrates a block diagram representative of an embodiment of a system, in accordance with an embodiment of the present invention.

FIG. 4 illustrates a block diagram representative of an embodiment of a system 400, in accordance with an embodiment of the present invention. The system 400 includes the TMU 112.3, the client device 204, and a server 410. In some embodiments, server 410 may be located in the same facility as loading facility 100 or implemented partially or fully in the TMU 112.3. In other embodiments, server 410 may be located at a remote location, such as on a cloud-platform or other remote location. In either embodiment, server 410 may be communicatively coupled to a 3D-depth camera (e.g., 3D depth camera 302).

Server 410 is configured to execute computer instructions to perform operations associated with the systems and methods as described herein, for example, implement the example operations represented by the block diagrams or flowcharts of the drawings accompanying this description. The server 410 may implement enterprise service software that may include, for example, RESTful (representational state transfer) API services, message queuing service, and event services that may be provided by various platforms or specifications, such as the J2EE specification implemented by any one of the Oracle WebLogic Server platform, the JBoss platform, or the IBM Web Sphere platform, etc. Other technologies or platforms, such as Ruby on Rails, Microsoft .NET, or similar may also be used.

Figure 5A:
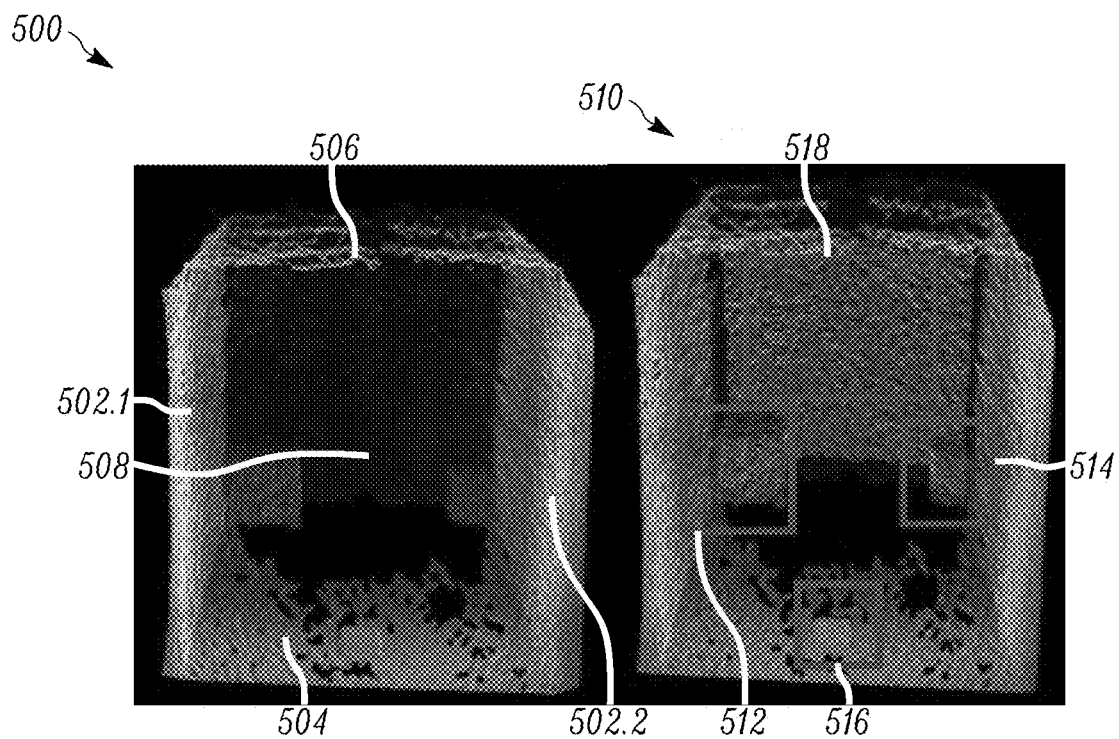
FIG. 5A illustrates a side-by-side view of an interior of the trailer 102 of FIG. 1, and depicts a removal process of walls and floors of the trailer 102 in a straight-rail configuration, in accordance with an embodiment of the present invention.

FIG. 5A illustrates a side-by-side view representing the trailer 102 of FIG. 1, and depicts a removal process of walls and floors of the trailer 102 in a straight-rail configuration, in accordance with an embodiment of the present invention. The first pre-removal image 500 includes a 3D representation of the interior of the trailer 102 that includes a first left wall 502.1, a first right wall 502.2, a floor 504, a first top portion 506, and a first interior 508.

The first removal image 510 includes a modified 3D representation of the trailer 102 after the method discussed herein has been applied to the pre-removal image 500. As further discussed herein in reference to FIG. 7, the removal image 510 includes a modified 3D representation of the trailer 102 that includes only a portion of the first interior 508. Namely, the removal image 510 includes a first object 512, a second object 514, a third object 516, and a first back wall 518.

Figure 5B:
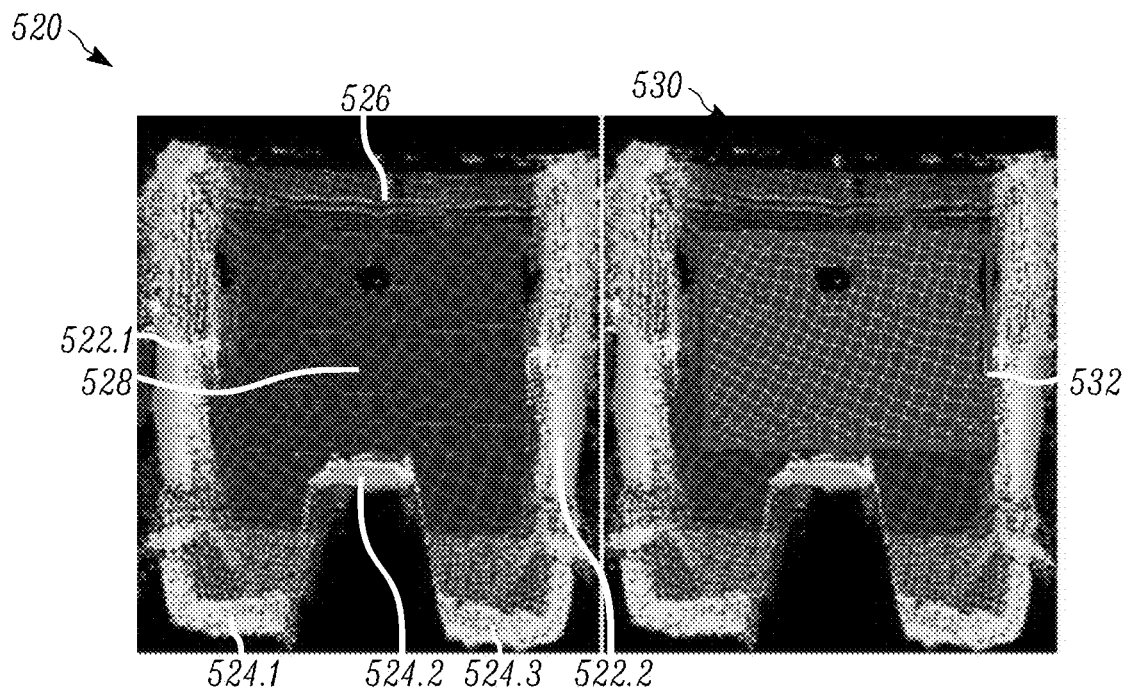
FIG. 5B illustrates a side-by-side view of an interior of the trailer 102 of FIG. 1, and depicts a removal process of walls and floors of the trailer 102 in a drop-frame configuration, in accordance with an embodiment of the present invention.

FIG. 5B illustrates a side-by-side view representing the trailer 102 of FIG. 1, and depicts a removal process of walls and floors of the trailer 102 in a drop-frame configuration, in accordance with an embodiment of the present invention. The second pre-removal image 520 includes a 3D representation of the trailer 102 that includes a second left wall 522.1, a second right wall 522.2, a first floor 524.1, a second floor 524.2, and third floor 524.3, a second top portion 526, and a second interior 528.

The second removal image 530 includes a modified 3D representation of the trailer 102 after the method discussed herein has been applied to the second pre-removal image 520. As further discussed herein in reference to FIG. 7, the removal image 530 includes a modified 3D representation of the trailer 102 that includes only a portion of the second interior 528. Namely, the second removal image 530 includes a second back wall 532.

Figure 6:
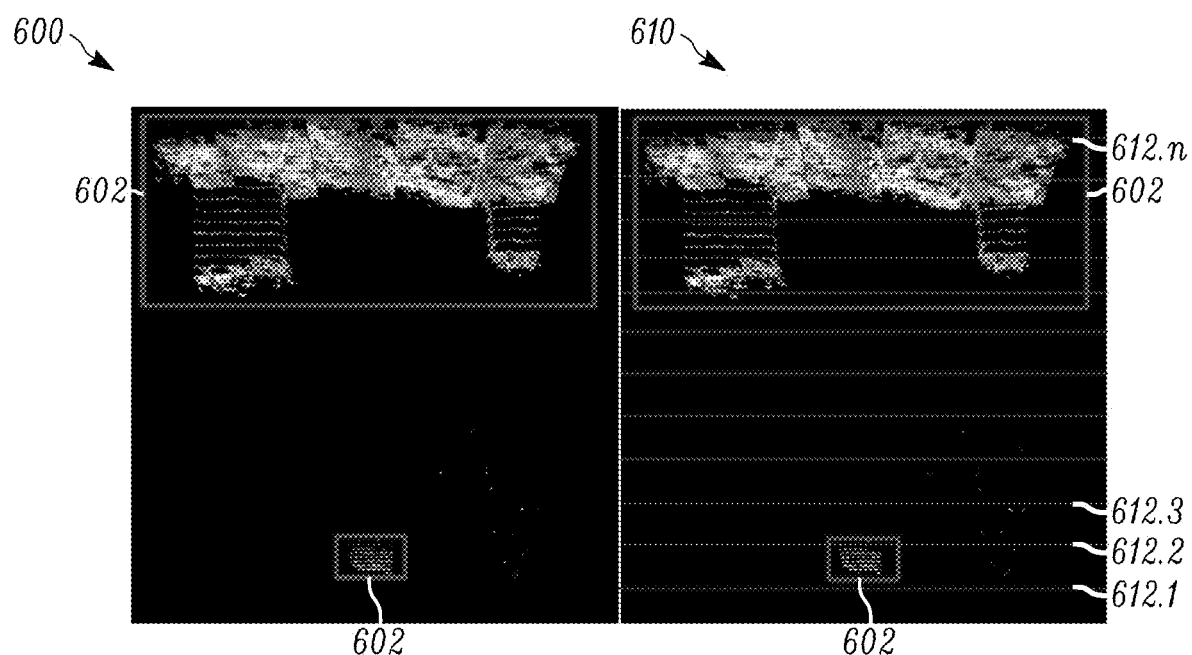
FIG. 6 is a side-by-side, top-down view diagram representing the trailer 102 of FIG. 1, and depicting a plurality of segmented trailer 102 sections, in accordance with an embodiment of the present invention.

FIG. 6 is a side-by-side, top-down view diagram representing the trailer 102 of FIG. 1, and depicting a plurality of segmented trailer 102 sections, in accordance with an embodiment of the present invention. The modified three dimensional image 600 includes a modified plurality of points 602 as obtained, for example, from the modified 3D representation of the trailer 102 in the first removal image 510 in FIG. 5A. As further discussed herein in reference to FIG. 7, the modified three dimensional image 600 is subjected to a segmentation process to yield the segmented modified three dimensional image 610. The segmented modified three dimensional image 610 includes the modified plurality of points 602 and a plurality of bins 612.1-612.n. The plurality of bins 612.1-612.n, as illustrated in FIG. 6, may include any number of bins from a first bin 612.1, a second bin 612.2, and a third bin 612.3 to any "n" number of bins (represented as 612.n).

Figure 7:
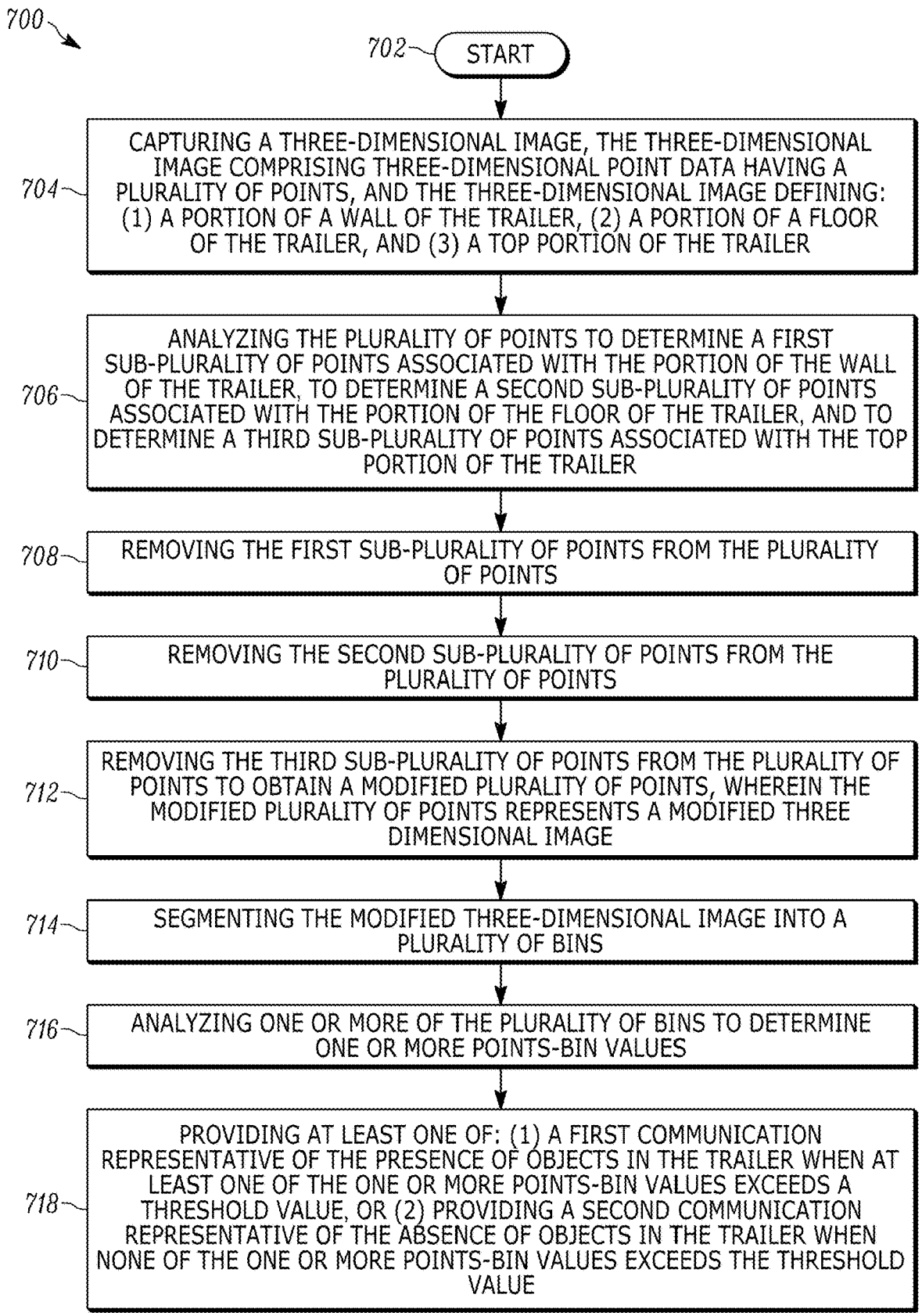
FIG. 7 illustrates a flowchart representative of a method of detecting a presence or absence of packages in a trailer 102, in accordance with an embodiment of the present invention.

FIG. 7 illustrates a flowchart representative of a method of detecting a presence or absence of packages in a trailer 102, in accordance with an embodiment of the present invention. A method 700 starts (702) at block 704 where a camera (e.g., 3D depth camera 302 of the TMU 112.3) captures a three-dimensional image. The three-dimensional image comprises three-dimensional point data having a plurality of points, and the three-dimensional image defines: (1) a portion of a wall of the trailer 102, (2) a portion of a floor of the trailer 102, and (3) a top portion of the trailer 102. For example, in various embodiments, the 3D depth camera 302 of the TMU 112.3 may capture an image of the trailer 102, which would include the first left wall 502.1, the first right wall 502.2, the floor 504, the first top portion 506, and the first interior 508 of the first pre-removal image 500 of FIG. 5A. Alternatively, in various embodiments, the 3D depth camera 302 of the TMU 112.3 may capture an image of the trailer 102, which would include the second left wall 522.1, the second right wall 522.2, a first floor 524.1, a second floor 524.2, and third floor 524.3, a second top portion 526, and a second interior 528 of the second pre-removal image 520 of FIG. 5B.

At block 706, the TMU 112.3 analyzes the plurality of points to determine a first sub-plurality of points associated with the portion of the wall of the trailer 102, a second sub-plurality of points associated with the portion of the floor of the trailer 102, and a third sub-plurality of points associated with the top portion of the trailer 102. For example, in various embodiments and in reference to FIG. 5A, the TMU 112.3 may determine that the points comprising the first left wall 502.1 and the first right wall 502.2 belong in the first sub-plurality of points, the points comprising the floor 504 belong in the second sub-plurality of points, and the points comprising the first top portion 506 belong in the third sub-plurality of points. Alternatively, in various embodiments and in reference to FIG. 5B, the TMU 112.3 may determine that the points comprising the second left wall 522.1 and the second right wall 522.2 belong in the first sub-plurality of points, the points comprising the first floor 524.1, the second floor 524.2, and the third floor 524.3 belong in the second sub-plurality of points, and the points comprising the second top portion 526 belong in the third sub-plurality of points. In either example, each of the points in the plurality of points may have an x-value, a y-value, and a z-value. The x-value refers to the lateral position of the point in the trailer 102, the y-value refers to the vertical position of the point in the trailer 102, and the z-value refers to the depth of the point in the trailer 102. Collectively, the x-value, y-value, and z-value of any point of the plurality of points or the modified plurality of points define what is herein referred to as the "location" of any point of the plurality of points or the modified plurality of points.

In various embodiments, determining the first sub-plurality of points comprises determining initial values of a set of parameters. In these embodiments, based on the initial values of the set of parameters, the TMU 112.3 may perform a plurality of iterations of an iterative algorithm to identify the first sub-plurality of points corresponding to a first wall and a second wall. For example, referring to FIG. 5A, when the TMU 112.3 determines the first sub-plurality of points, it may assign the points comprising the first left wall 502.1 to the first sub-plurality of points during a first iteration of the iterative algorithm. In this example, the TMU 112.3 may then assign the points comprising the first right wall 502.2 to the first sub-plurality of points during a second iteration of the iterative algorithm. Alternatively, referring to FIG. 5B, when the TMU 112.3 determines the first sub-plurality of points, it may assign the points comprising the second left wall 522.1 to the first sub-plurality of points during a first iteration of the iterative algorithm. In this example, the TMU 112.3 may then assign the points comprising the second right wall 522.2 to the first sub-plurality of points during a second iteration of the iterative algorithm. In various embodiments, the iterative algorithm may comprise a random sample consensus (RANSAC) segmentation analysis algorithm. Additionally, the plurality of iterations may include any number of iterations suitable to determine the walls of the trailer 102.

In various embodiments, the trailer 102 may be in a drop-frame configuration. In these embodiments, determining the second sub-plurality of points may comprise determining initial values of a set of parameters. Based on the initial values of the set of parameters, the TMU 112.3 may perform a plurality of iterations of an iterative algorithm to identify the second sub-plurality of points corresponding to one or more floors of the trailer 102. For example, referring to FIG. 5B, when the TMU 112.3 determines the second sub-plurality of points, it may assign the points comprising the first floor 524.1 to the second sub-plurality of points during a first iteration of the iterative algorithm. In this example, the TMU 112.3 may then assign the points comprising the second floor 524.2 to the second sub-plurality of points during a second iteration of the iterative algorithm. Finally in this example, the TMU 112.3 may then assign the points comprising the third floor 524.3 to the second sub-plurality of points during a third iteration of the iterative algorithm. For each iteration of the iterative algorithm that does not yield a floor plane, the initial values of the set of parameters are relaxed to allow for a more inclusive search in the successive iteration of the iterative algorithm. For example, if the first iteration of the present embodiment did not yield the inclusion of the first floor 524.1 to the second sub-plurality of points, then the initial values of the set of parameters would be relaxed to create relaxed values of the set of parameters for the second iteration. These relaxed values of the set of parameters would be used in the second iteration, and the iterative algorithm would continue the floor identification process.

To determine the third sub-plurality of points, the TMU 112.3 may analyze the y-values of each of the points in the plurality of points to determine those points which have a y-value above a threshold y-value. For example, the y-values in the trailer 102 may range from 0 to 1. In this example, the top of the trailer 102 may have a y-value of 1, the bottom of the trailer may have a y-value of 0, and the threshold y-value may have a y-value of 0.5. Further in this example, if the TMU 112.3 identifies a point in the plurality of points with a y-value greater than or equal to 0.5 that is not already included in either the first sub-plurality of points or the second sub-plurality of points, the TMU 112.3 may include that point in the third sub-plurality of points. It should be understood that the y-values and the threshold y-value may be of any suitable range and/or quantity.

In various embodiments, the iterative algorithm of the prior example may comprise a RANSAC segmentation analysis algorithm. Additionally, in the prior example, the plurality of iterations may include up to four iterations. However, it should be understood that in alternative embodiments the plurality of iterations may include any number of iterations suitable to determine the floors of the trailer 102. Alternatively, it should be understood that the method described in these embodiments may be used when the trailer 102 is in a straight-rail configuration or any other configuration.

At block 708 the TMU 112.3 removes the first sub-plurality of points from the plurality of points. For example, in various embodiments and in reference to FIG. 5A, the TMU 112.3 may remove the points comprising the first left wall 502.1 and the first right wall 502.2 from the plurality of points as the points comprising the first left wall 502.1 and the first right wall 502.2 are each included in the first sub-plurality of points in this example, as explained above. Alternatively, in various embodiments and in reference to FIG. 5B, the TMU 112.3 may remove the points comprising the second left wall 522.1 and the second right wall 522.2 from the plurality of points as the points comprising the second left wall 522.1 and the second right wall 522.2 are included in the first sub-plurality of points in this example, as explained above. After block 708, in both examples, the plurality of points includes at least the second sub-plurality of points and the third sub-plurality of points. However, it should be understood that the removal process may take place in any suitable order (i.e., removing the floors before the walls or top half of the trailer 102, removing the top half before the walls or floor of the trailer 102, etc.). Additionally, in various embodiments, the first sub-plurality of points may be removed from the plurality of points as part of a RANSAC segmentation analysis algorithm.

At block 710 the TMU 112.3 removes the second sub-plurality of points from the plurality of points. For example, in various embodiments and in reference to FIG. 5A, the TMU 112.3 may remove the points comprising the floor 504 from the plurality of points as the points comprising the floor 504 are included in the second sub-plurality of points in this example, as explained above. Alternatively, in various embodiments and in reference to FIG. 5B, the TMU 112.3 may remove the points comprising the first floor 524.1, the second floor 524.2, and the third floor 524.3 from the plurality of points as the points comprising the first floor 524.1, the second floor 524.2, and the third floor 524.3 are each included in the second sub-plurality of points in this example, as explained above. After block 710, in both examples, the plurality of points includes at least the third sub-plurality of points. In various embodiments, the second sub-plurality of points may be removed from the plurality of points as part of a RANSAC segmentation analysis algorithm.

At block 712 the TMU 112.3 removes the third sub-plurality of points from the plurality of points. For example, in various embodiments and in reference to FIG. 5A and block 706, the TMU 112.3 may remove the points comprising the first top portion 506 from the plurality of points as the points comprising the first top portion 506 are included in the third sub-plurality of points in this example, as explained above. Alternatively, in various embodiments and in reference to FIG. 5B, the TMU 112.3 may remove the points comprising the second top portion 526 from the plurality of points, as the points comprising the second top portion 526 are included in the third sub-plurality of points in this example, as explained above. After the TMU 112.3 removes the third sub-plurality of points from the plurality of points, the plurality of points becomes the modified plurality of points 602. The modified plurality of points 602 may include points of the first interior 508, as in FIG. 5A, or of the second interior 528, as in FIG. 5B. Moreover, the modified plurality of points 602 represents the modified three dimensional image 600.

At block 714 the TMU 112.3 may segment the modified three dimensional image 600 into a plurality of bins 612.1-612.$n$. For example, in various embodiments and in reference to FIG. 6, the TMU 112.3 may segment the modified three dimensional image 600 into n bins (i.e., 612.1, 612.2, 612.3, . . . , 612.$n$), where n is some number greater than 1. In this example, then bins of the plurality of bins 612.1-612.$n$ may extend laterally across the trailer 102 (e.g., from the first left wall 502.1 to the first right wall 502.2 of FIG. 5A), and each successive bin is located deeper in the trailer 102. In various embodiments, the segmentation operation of the modified three-dimensional image into a plurality of bins 612.1-612.$n$ is based on the length of the trailer 102. In these embodiments, each of the plurality of bins 612.1-612.$n$ corresponds to about 1' of length of the trailer 102.

After the modified three-dimensional image 600 is segmented into the plurality of bins 612.1-612.$n$, the modified plurality of points 602 may be iterated across the modified three-dimensional image 600 to create the segmented modified three dimensional image 610. The iteration of the modified plurality of points 602 across the modified three-dimensional image 600 includes placing each of the modified plurality of points 602 into one of the plurality of bins 612.1-612.$n$ based on each of the modified plurality of points' 602 location in the trailer 102.

At block 716 the TMU 112.3 may analyze one or more of the plurality of bins 612.1-612.$n$ to determine one or more points-bin values. By the time the TMU 112.3 performs this step, the only points remaining in the modified plurality of points 602 are noise points, points corresponding to an object left in the trailer 102, or the back wall of the trailer 102 (e.g., the first back wall 518, or the second back wall 532). If the depth of the trailer 102 is known, then the back wall can be filtered out, leaving the TMU 112.3 to analyze one or more of the plurality of bins 612.1-612.$n$ to determine one or more points-bin values based on either noise points or points corresponding to an object left in the trailer 102. In various embodiments, the one or more points-bin values each define a respective plurality of points. In these embodiments, the respective plurality of points is a subset of the plurality of points. In various other embodiments, the analysis of block 176 may be performed by a backend server, for example, the server 410 of FIG. 4.

At block 718 the TMU 112.3 may provide at least one of: (1) a first communication representative of the presence of objects in the trailer 102 when at least one of the one or more points-bin values exceeds a threshold value, or (2) providing a second communication representative of the absence of objects in the trailer 102 when none of the one or more points-bin values exceeds the threshold value. To generate either of the first or second communication, the TMU 112.3 may compare the points-bin values to a threshold value, wherein the threshold value is used to filter out the noise points. In various embodiments, the threshold value may be based on the length of the trailer 102.

If the TMU 112.3 determines that any respective bin of the plurality of bins 612.1-612.$n$ has a points-bin value that exceeds the threshold value, the TMU 112.3 will conclude at least one object has been left in the trailer 102. Accordingly, the TMU 112.3 will then provide the first communication. Alternatively, if the TMU 112.3 found no respective bin of the plurality of bins 612.1-612.$n$ had a points-bin value that exceeded the threshold value, the TMU 112.3 would provide the second communication. In either scenario, the first and second communications allow an end user to determine in real time whether additional action should be taken in regard to unloading the trailer 102. In various other embodiments of block 718, if the TMU 112.3 determines that a respective bin of the plurality of bins 612.1-612.$n$ has a points-bin value which exceeds the threshold value, the TMU 112.3 may translate the number of the respective bin of the plurality of bins 612.1-612.$n$ into a depth value corresponding to at least one object's physical location in the trailer 102. In this embodiment, the first communication may include the physical location of the at least one object.

In various embodiments, the analysis of block 718 may be performed by a backend server, for example, the server 410 of FIG. 4. It should be understood that the analysis and actions of blocks 706, 708, 710, 712, and 714 may also be performed by a backend server, for example, the server 410 of FIG. 4.

The terms transmitter, receiver, and transceiver are used herein for example purposes and should not be construed as limiting. For example, it will be understand that references to an element being a transmitter or a receiver include that element being a transceiver. Furthermore, any reference to an element being a transceiver may include that element being implemented as a transmitter and/or receiver depending on whether the element is sending and/or receiving data.

While the techniques herein have been described in terms of examination proper placement of a package at a loading facility onto a container (or trailer) at a loading bay, the techniques could be modified to assess whether a package on a container (or trailer) when scanned by a wearable computer is determined be at the proper loading bay. The operation processes would be similar to the techniques described above, with the wearable computer communicating with a server, after scanning an indicia and then, after receiving beacon identification information from the server, determining, as the package is removed from the container (or trailer) whether the package is being removed at the appropriate loading bay or not.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for detecting a presence or absence of objects in a trailer, comprising:
   capturing a three-dimensional image, the three-dimensional image comprising three-dimensional point data having a plurality of points, and the three-dimensional image defining: (1) a portion of a wall of the trailer, (2) a portion of a floor of the trailer, and (3) a top portion of the trailer;
   analyzing the plurality of points to determine a first sub-plurality of points associated with the portion of the wall of the trailer, to determine a second sub-plurality of points associated with the portion of the floor of the trailer, and to determine a third sub-plurality of points associated with the top portion of the trailer;

removing the first sub-plurality of points from the plurality of points;

removing the second sub-plurality of points from the plurality of points;

removing the third sub-plurality of points from the plurality of points to obtain a modified plurality of points, wherein the modified plurality of points represents a modified three-dimensional image;

segmenting the modified three-dimensional image into a plurality of bins;

analyzing one or more of the plurality of bins to determine one or more points-bin values; and providing at least one of: (1) a first communication representative of the presence of objects in the trailer when at least one of the one or more points-bin values exceeds a threshold value, or (2) providing a second communication representative of the absence of objects in the trailer when none of the one or more points-bin values exceeds the threshold value wherein
determining the first sub-plurality of points comprises:
determining initial values of a set of parameters; and
based on the initial values of the set of parameters, performing a plurality of iterations of an iterative algorithm to identify the first sub-plurality of points corresponding to a first wall and a second wall.

2. The method of claim 1, wherein the iterative algorithm comprises a random sample consensus (RANSAC) segmentation analysis algorithm, and wherein the plurality of iterations includes two iterations.

3. The method of claim 1, wherein the trailer is a drop-frame configuration or a straight-rail configuration.

4. The method of claim 3, wherein
determining the second sub-plurality of points comprises:
determining initial values of a set of parameters; and
based on the initial values of the set of parameters, performing a plurality of iterations of an iterative algorithm to identify the second sub-plurality of points corresponding to the one or more floors of the trailer.

5. The method of claim 4, wherein the iterative algorithm comprises a random sample consensus (RANSAC) segmentation analysis algorithm, and wherein the plurality of iterations includes up to four iterations.

6. The method of claim 1, wherein the threshold is based on the length of the trailer.

7. The method of claim 1, wherein the segmentation operation of the modified three-dimensional image into a plurality of bins is based on the length of the trailer, and wherein each of the plurality of bins corresponds to about 1' of length of the trailer.

8. The method of claim 7, wherein the first communication includes a physical location of at least one object in the trailer, the physical location corresponding to a respective bin of the plurality of bins where the at least one object is located.

9. The method of claim 1, wherein the one or more points-bin values each define a respective plurality of points, and wherein the respective plurality of points is a subset of the plurality of points.

10. A system for detecting a presence or absence of objects in a trailer, comprising:

a user interface;
a trailer monitoring unit (TMU) mounted proximate a loading bay and communicatively connected with the user interface, the TMU including:
a housing; and
an imaging assembly at least partially within the housing and configured to capture a three-dimensional image, the three-dimensional image comprising three-dimensional point data having a plurality of points, and the three-dimensional image defining: (1) a portion of a wall of the trailer, (2) a portion of a floor of the trailer, and (3) a top portion of the trailer;
wherein the TMU is configured to:
analyze the plurality of points to determine a first sub-plurality of points associated with the portion of the wall of the trailer, to determine a second sub-plurality of points associated with the portion of the floor of the trailer, and to determine a third sub-plurality of points associated with the top portion of the trailer;
remove the first sub-plurality of points from the plurality of points;
remove the second sub-plurality of points from the plurality of points;
remove the third sub-plurality of points from the plurality of points to obtain a modified plurality of points, wherein the modified plurality of points represent a modified three-dimensional image;
segment the modified three-dimensional image into a plurality of bins; and
provide a primary communication representative of the modified three-dimensional image segmented into a plurality of bins; and
a server communicatively connected to the TMU and user interface, the server configured to:
receive the primary communication from the TMU;
analyze one or more of the plurality of bins to determine one or more points-bin values; and
provide at least one of: (1) a first communication to a client device representative of the presence of objects in the trailer when at least one of the one or more points-bin values exceeds a threshold value, or (2) providing a second communication to a client device representative of the absence of objects in the trailer when none of the one or more points-bin values exceeds the threshold value, wherein the client device is communicatively coupled to the server.

11. The system of claim 10, wherein
determining the first sub-plurality of points comprises:
determining initial values of a set of parameters; and
based on the initial values of the set of parameters, performing a plurality of iterations of an iterative algorithm to identify the first sub-plurality of points corresponding to a first wall and a second wall.

12. The system of claim 11, wherein the iterative algorithm comprises a random sample consensus (RANSAC) segmentation analysis algorithm, and wherein the plurality of iterations includes two iterations.

13. The system of claim 10, wherein the trailer is a drop-frame configuration or a straight-rail configuration.

14. The system of claim 13, wherein
determining the second sub-plurality of points comprises:
determining initial values of a set of parameters; and
based on the initial values of the set of parameters, performing a plurality of iterations of an iterative algorithm to identify the second sub-plurality of points corresponding to the one or more floors of the trailer.

15. The system of claim 14, wherein the iterative algorithm comprises a random sample consensus (RANSAC) segmentation analysis algorithm, and wherein the plurality of iterations includes up to four iterations.

16. The system of claim 10, wherein the threshold is based on the length of the trailer.

17. The system of claim 10, wherein the segmentation operation of the modified three-dimensional image into a plurality of bins is based on the length of the trailer, and wherein each of the plurality of bins corresponds to about 1' of length of the trailer.

18. The system of claim 17, wherein the first communication includes a physical location of at least one object in the trailer, the physical location corresponding to a respective bin of the plurality of bins where the at least one object is located.

19. The system of claim 10, wherein the one or more points-bin values each define a respective plurality of points, and wherein the respective plurality of points is a subset of the plurality of points.

20. A method for detecting a presence or absence of objects in a trailer, comprising:

capturing a three-dimensional image, the three-dimensional image comprising three-dimensional point data having a plurality of points, and the three-dimensional image defining: (1) a portion of a wall of the trailer, (2) a portion of a floor of the trailer, and (3) a top portion of the trailer;

analyzing the plurality of points to determine a first sub-plurality of points associated with the portion of the wall of the trailer, to determine a second sub-plurality of points associated with the portion of the floor of the trailer, and to determine a third sub-plurality of points associated with the top portion of the trailer;

removing the first sub-plurality of points from the plurality of points;

removing the second sub-plurality of points from the plurality of points;

removing the third sub-plurality of points from the plurality of points to obtain a modified plurality of points, wherein the modified plurality of points represents a modified three-dimensional image;

segmenting the modified three-dimensional image into a plurality of bins;

analyzing one or more of the plurality of bins to determine one or more points-bin values; and providing at least one of: (1) a first communication representative of the presence of objects in the trailer when at least one of the one or more points-bin values exceeds a threshold value, or (2) providing a second communication representative of the absence of objects in the trailer when none of the one or more points-bin values exceeds the threshold value, wherein the threshold is based on the length of the trailer.

* * * * *